Sept. 6, 1955     E. O. OWENS ET AL     2,716,885

LEAK DETECTOR

Filed Aug. 27, 1952

INVENTOR.
EDWARD ORVILLE OWENS
LOUIE MARTIN EZZELL
BY

ATTORNEY

United States Patent Office 2,716,885
Patented Sept. 6, 1955

2,716,885

LEAK DETECTOR

Edward Orville Owens and Louie Martin Ezzell, Abbeville, Ala.

Application August 27, 1952, Serial No. 306,544

2 Claims. (Cl. 73—48)

This invention relates to a leak detector, and more particularly to a device for detecting leaks in valves of pneumatic tires for vehicles and the like.

In the past, leak detectors have been manufactured which consist of a transparent cylinder connected to a conduit through a suitable valve. Liquid is provided in this transparent cylinder so that when the conduit is placed over the valve of a pneumatic tire, any leak therefrom will be detected by bubbles appearing in the liquid. Escape means, such as a valve on the other end of the cylinder, allows the air passing through the liquid to pass out to the atmosphere. Since these leak detectors are used to detect minute pressures, it is obvious that the valve between the conduit and the cylinder must be sensitive and well constructed to always function when desired. It is equally obvious that certain parts of the valve will always be in contact with the liquid within the cylinder and are therefore subject to being corroded by this liquid.

Accordingly, it is an object of our invention to provide a leak detector of the class described which has no valves or moving parts to become corroded, out of adjustment, or inoperative.

Another object of our invention is to provide a leak detector which is extremely simple in construction, and which will lend itself well to mass production.

Another object of our invention is to provide a leak detector which is durable in construction, efficient in operation, and economical to manufacture.

Other and further objects and advantages of our invention will become apparent from the following description when taken in conjunction with the accompanying drawings wherein like figures of reference designate corresponding parts throughout the several views, and wherein.

Figure 1:
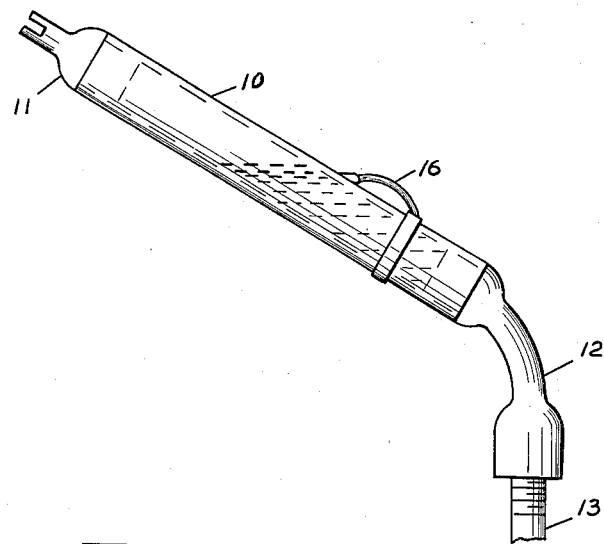
Fig. 1 is a side elevation of a leak detector embodying our invention, the same being applied to the stem of an inflation valve of a pneumatic tire.

Referring now in detail to the embodiment chosen for purpose of illustration, numeral 10 denotes a hollow cylindrical tube, or chamber, of glass, plastic or other suitable transparent material which is closed at the top by cap 11 which may be in the form of a valve tool. While we have illustrated cap 11 as a metallic valve tool, it is apparent that cap 11 may be formed in any desired shape to merely close tube 10; since, contrary to prior art devices, our leak detector needs no valve in this cap.

Snugly fitted to the other end of tube 10 is a hard rubber or plastic conduit 12. Conduit 12 tapers to a small diameter which is curved for convenience, and then its free end is belled out to fit over valve stem 13 of a pneumatic tire (not shown).

Figure 2:
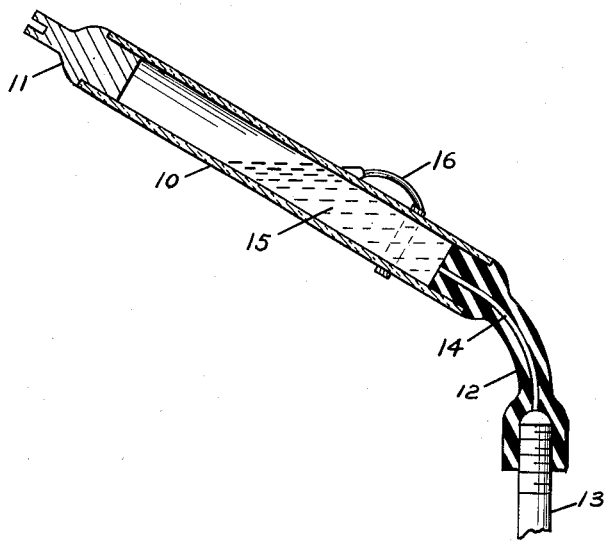
Fig. 2 is a cross-sectional view of the leak detector illustrated in Fig. 1.

According to our invention, conduit 12 is provided with a small axial or center passage, as shown in Fig. 2, and this passage communicates with tube 10, so that air from valve stem 13 may pass into the tube.

By removing either cap 11 or conduit 12, tube 10 may be partially filled with liquid 15, such as water, oil or some other suitable liquid having a surface tension such that it will not enter channel 14.

On tube 10, adjacent conduit 12, we have provided a conventional spring clip 16, so that when our leak detector is not in use it may be carried in a person's pocket as a fountain pen is carried. It is to be remembered that cap 11 completely closes one end of tube 10; and, therefore, there is no danger of any liquid 15 leaking through cap 11 to soil or damage a person's shirt; and, since conduit 12 normally extends upwardly when our leak detector is clipped to a person's shirt or coat pocket, there is no opportunity for liquid 15 to escape.

It is apparent from the foregoing description that with the surface tension of liquid 15 known, the diameter of channel 14 may be calculated so that normally none of the liquid will pass therethrough; and yet this diameter will be quite sufficient to permit the passage of air from valve stem 13 into tube 10 when our leak detector is in use. It is obvious that this air will form small bubbles which will percolate through liquid 15 and be readily perceptible to the eye. Since our leak detector will be only used to detect small leaks of air from the valve stem, no appreciable pressure will be built up within tube 10 and air will easily escape from tube 10 through channel 14 after conduit 12 is removed from the valve stem.

It will be obvious to those skilled in the art that many variations may be made in the single embodiment shown and described without departing from the scope of our invention as defined by the following claims.

We claim:

1. A leak detector for valves of pneumatic tires comprising a transparent tube hermetically sealed at one end thereof, a conduit having one end fitted to the other end of said tube, said conduit being provided with a center passage therethrough and being sufficiently large at its free end to receive a valve stem, and liquid partially filling said tube, said liquid having a surface tension sufficiently great to prevent its entering said center passage of said conduit, said center passage being sufficiently large to allow air leaking from said valve stem to pass into said tube.

2. A leak detector for valves of pneumtatic tires comprising a transparent tube, a cap hermetically sealing one end of said tube, a flexible conduit having one end fitted to the other end of said tube, said conduit being provided with a center passage therethrough and being sufficiently large at its free end to receive a valve stem, and liquid partially filling said tube, said liquid having a surface tension sufficiently great to prevent its entering said center passage of said conduit, said center passage being sufficiently large to allow air leaking from said valve stem to pass into said tube.

References Cited in the file of this patent

UNITED STATES PATENTS

| | | |
|---|---|---|
| 1,490,670 | Law | Apr. 15, 1924 |
| 1,807,287 | Henkel | May 26, 1931 |
| 1,987,486 | Michaelis | Jan. 8, 1935 |